United States Patent
Diamanti et al.

(10) Patent No.: US 6,910,215 B1
(45) Date of Patent: Jun. 21, 2005

(54) METHODS, SYSTEMS AND COMPUTER PROGRAMS PRODUCTS FOR EXTENDING EXISTING APPLICATIONS WITH STATIC JAVA METHODS

(75) Inventors: Gary Francis Diamanti, Raleigh, NC (US); John Christian Fluke, Raleigh, NC (US); Ann Bieghler Shirk, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/565,128

(22) Filed: May 4, 2000

(51) Int. Cl.[7] .............................. G06F 3/00; G06F 9/44; G06F 9/46; G06F 13/00
(52) U.S. Cl. .................... 719/313; 719/315; 719/320
(58) Field of Search ................................ 719/310–316, 719/320, 328; 717/118, 147–148, 152, 166, 128; 709/231, 202, 319; 707/203

(56) References Cited

U.S. PATENT DOCUMENTS

| | | | | |
|---|---|---|---|---|
| 5,893,118 A | * | 4/1999 | Sonderegger | 707/203 |
| 5,907,707 A | | 5/1999 | Ramalingam et al. | 395/701 |
| 5,926,631 A | | 7/1999 | McGarvey | 395/500 |
| 6,226,666 B1 | * | 5/2001 | Chang et al. | 709/202 |
| 6,327,624 B1 | * | 12/2001 | Mathewson, II et al. | 709/231 |
| 6,434,625 B1 | * | 8/2002 | Loen | 709/236 |
| 6,675,371 B1 | * | 1/2004 | York et al. | 717/114 |

FOREIGN PATENT DOCUMENTS

| | | | | |
|---|---|---|---|---|
| WO | WO98/37486 | | 8/1998 | G06F/9/445 |
| WO | WO 98/37486 | * | 8/1998 | G06F/9/445 |
| WO | WO98/53398 | | 11/1998 | G06F/9/445 |

OTHER PUBLICATIONS

IBM, Runtime Translation of Java Based APIs for Use with Native Applications, IBM technical Disclosure Bulletin, Jan. 1, 2000, pp. 1 –14.*
Sun Microsystems, Essentials, Part 1: Compiling and Running a Simple Program, tutorials and Code Camps.*
4690 OS Version 2, Release 2 Programming Guide (Sep., 1999).
*System for Service Level Identification in a Client/Server WWW/Java Environment: Research Disclosure*, 412102, pp. 1149–1150 (Aug. 1998).
*Client Application for Integrating a Development Environment with a Web Distributed Authoring (WebDAV)Server, Research Disclosure*, 420136, pp. 578–579 (Apr. 1999).

(Continued)

Primary Examiner—Thomas Lee
Assistant Examiner—Diem Ky Cao
(74) Attorney, Agent, or Firm—Daniel E. McConnell; Myers Bigel Sibley & Sajovec PA

(57) ABSTRACT

Methods, systems and computer program products are provided for extending an application written in a first programming language with methods of Java classes, wherein the first programming language cannot directly access the Java classes. Such extension may be provided by-encapsulating differences between the first programming language and Java and/or a memory model of the application and a memory model of Java utilizing at least one subroutine accessible to the application and at least one Java class. Thus, for example, differences in memory models may be overcome by a subroutine which utilizes the memory model of the application being configured to communicate with a Java class which utilizes the memory model the JVM and which can invoke Java methods. The at least one subroutine and the at least one Java class may then be utilized to invoke Java methods from the application.

37 Claims, 7 Drawing Sheets

OTHER PUBLICATIONS

Small, Christopher, "A Tool for Constructing Safe Extensible C++ Systems", Jun. 16–20, 1997, USENIX Association Proceedings of the Third USENIX Conference, pp. 175–184.

Ball, Steve et al, "Are Java Applets Independent Programs?" Apr. 1999, Dr Dobb's Journal Issue, vol. 24, pp. 101–105.

Solozamo, Jose H., "Parametric Polymorphism for Java™ A Relective Solution," 1998, ACM Conference Proceedings OOPSLA 1998, pp. 216–225.

Nikander, P et al, "Distributed Policy Management for JDK 1.2," 1999, Proceedings 1999 Network and Distributed System Security Symposium, pp. 91–101 (Abstract Only).

* cited by examiner

METHODS, SYSTEMS AND COMPUTER PROGRAMS PRODUCTS FOR EXTENDING EXISTING APPLICATIONS WITH STATIC JAVA METHODS

FIELD OF THE INVENTION

The present invention relates to computer programs and more particularly to the extension of existing programs with functionality written in an incompatible programming language.

BACKGROUND OF THE INVENTION

The development of a data processing facility infrastructure generally occurs over time. Applications are typically originally acquired to provide a desired functionality when utilized with a particular data processing system platform. However, over time, as the capabilities of data processing systems have increased, new expectations have been developed for applications such that existing applications may no longer satisfy end-user's expectations. For example, an application developed for a command line based operating system, such as the Disk Operating System (DOS) may no longer satisfy the expectations of users who are familiar with graphic user interfaces, such as Microsoft Windows, Windows95, Windows98, and Windows2000 from Microsoft Corporation, Redmond, Wash., or OS/2 from International Business Machines, Armonk, N.Y.

One way in which such changes in expectations may be addressed is by periodically replacing existing applications with newer versions of the applications which take advantage of increases in processing capabilities of later data processing systems. This solution, however, may be very expensive, as replacement costs for many applications may be as much as, or more than, the original cost of the application. Furthermore, if functioning applications are replaced with newer versions there is a risk that the newer versions will have "bugs" or problems that were not present in the existing applications. Also, newer versions of some applications may not exist or may be prohibitively expensive to create. Thus, merely replacing existing applications with newer versions of the applications may be expensive, risky or impossible.

Alternatively, existing applications may be augmented with new user interfaces or functions so as to provide increased functionality while still utilizing the original application. For example, graphic user interfaces may be provided to text based programs by converting the text interface to graphic representations of the text interface. Such extensions may be even more efficient if common program code is utilized to provide the increased functionality. For example, in the object oriented Java programming language developed by Sun Microsystems, class libraries may be available which provide common methods which may be utilized to implement functions provided by the class library. Thus, if existing applications could access the methods of a Java class library it might be possible to add the functionality of the class library to the application.

Unfortunately, not all existing applications may access methods of a Java class library. While applications which are 32 bit applications written in C or C++ may use the Java Native Interface (JNI) to incorporate Java methods into an application, JNI typically does not support other programming languages or 16 bit applications. For example, current Java class libraries are 32 bit applications which may not be directly accessed by a 16 bit application. Accordingly, an existing application written in, for example, CBASIC may not directly invoke methods in a Java class library. Thus, the functionality provided by static methods of a Java class library may be unavailable to existing applications which cannot access methods of the Java class library directly.

Accordingly, a need exists for improvements in how existing applications may be extended with static Java methods.

SUMMARY OF THE INVENTION

Embodiments of the present invention include methods, systems and computer program products which may provide for extending an application written in a first programming language with methods of Java classes, wherein the first programming language cannot directly access the Java classes. Such extension may be provided by encapsulating differences between the first programming language and Java and/or a memory model of the application and a memory model of Java utilizing at least one subroutine accessible to the application and at least one Java class. Thus, for example, differences in memory models may be overcome by a subroutine which utilizes the memory model of the application being configured to communicate with a Java class which utilizes the memory model of the JVM and which can invoke Java methods. The at least one subroutine and the at least one Java class may then be utilized to invoke Java methods from the application. As used herein, the term "encapsulating" is used to refer to providing program code which makes the invocation of the Java method transparent to the existing application and preferably the return of results from the invocation of the Java method transparent to the Java method. Thus, through encapsulation of the differences between the existing application and Java the present invention may make it appear that the existing application is invoking a Java method which is compatible with the existing application and, optionally, that the Java method is providing results to an application that is compatible with the Java method.

In particular embodiments of the present invention, the at least one subroutine and the at least one Java class may be utilized by calling the at least one subroutine accessible by the application so as to build a message having content which identifies a Java method to invoke. The message is sent to a Java Virtual Machine. The Java class is executed on the Java Virtual Machine (JVM) and the Java class receives the message and interprets the message so as to identify a Java method to invoke. The Java method identified in the message may then be invoked.

In further embodiments of the present invention, a message is built having content which identifies a Java Class associated with the Java method to invoke, the Java method to invoke and pass parameters for the Java method to invoke. In particular, the message may be a byte array. Furthermore, the message may be sent to a Java Virtual Machine by sending the message to an operating system driver and sending the message from the operating system driver to the Java class.

In particular embodiments of the present invention, the message is sent from the operating system driver to the Java class by queuing the message at the device driver and receiving at the device driver a request for a message from the Java class. The queued message is provided to the Java class in response to the request from the Java class.

In still further embodiments of the present invention, a message may be built having content which identifies a Java class of the Java method to invoke, the Java method to invoke, pass parameters, and a type for at least one return parameter from the Java method. In such embodiments, the Java class which receives and interprets the message also receives return parameters from the invoked Java method. At least one return parameter is incorporated in a return message and the return message is sent from the Java class to the at least one subroutine which invoked the Java method. The return message may then be provided to the application so as to provide the return parameter of the type specified by the built message. In particular embodiments, the return message is a byte array. Furthermore, the return message may be sent from the Java class to the at least one subroutine by sending the return message to an operating system driver and sending the return message from the operating system driver to the at least one subroutine.

In yet other embodiments of the present invention, differences between at least one of the first programming language and Java and/or a memory model of the application and a memory model of Java may be encapsulated utilizing a plurality of subroutines and at least one Java class. In such embodiments, the plurality of subroutines and the at least one Java class may be utilized to invoke Java methods from the application. Furthermore, selected ones of the plurality of subroutines and the at least one Java class may be utilized to invoke Java methods from the application.

In further embodiments of the present invention, a system for extending existing applications with Java methods is provided. The system may include an application utilizing a first memory model and a Java Virtual Machine utilizing a second memory model, different from the first memory model. A Java class is configured to receive requests to invoke a static Java method and at least one subroutine, callable by the application, is configured to send messages to the Java class to invoke a static Java method.

In particular embodiments, an operating system driver configured to receive requests from the at least one subroutine and provide the received requests to the Java class is also provided.

In still further embodiments of the present invention, the Java class is further configured to return results of the invocation of the Java method to the at least one subroutine. The at least one subroutine is also further configured to provide the returned results to the application. The system may is further include an operating system driver configured to receive requests from the at least one subroutine and provide the received requests to the Java class and to receive results for the Java class and provide the results to the at least one subroutine.

While the invention has been described above primarily with respect to the method aspects of the invention, both systems and/or computer program products are also provided.

DETAILED DESCRIPTION OF PREFERRED EMBODIMENTS

Figure 1:
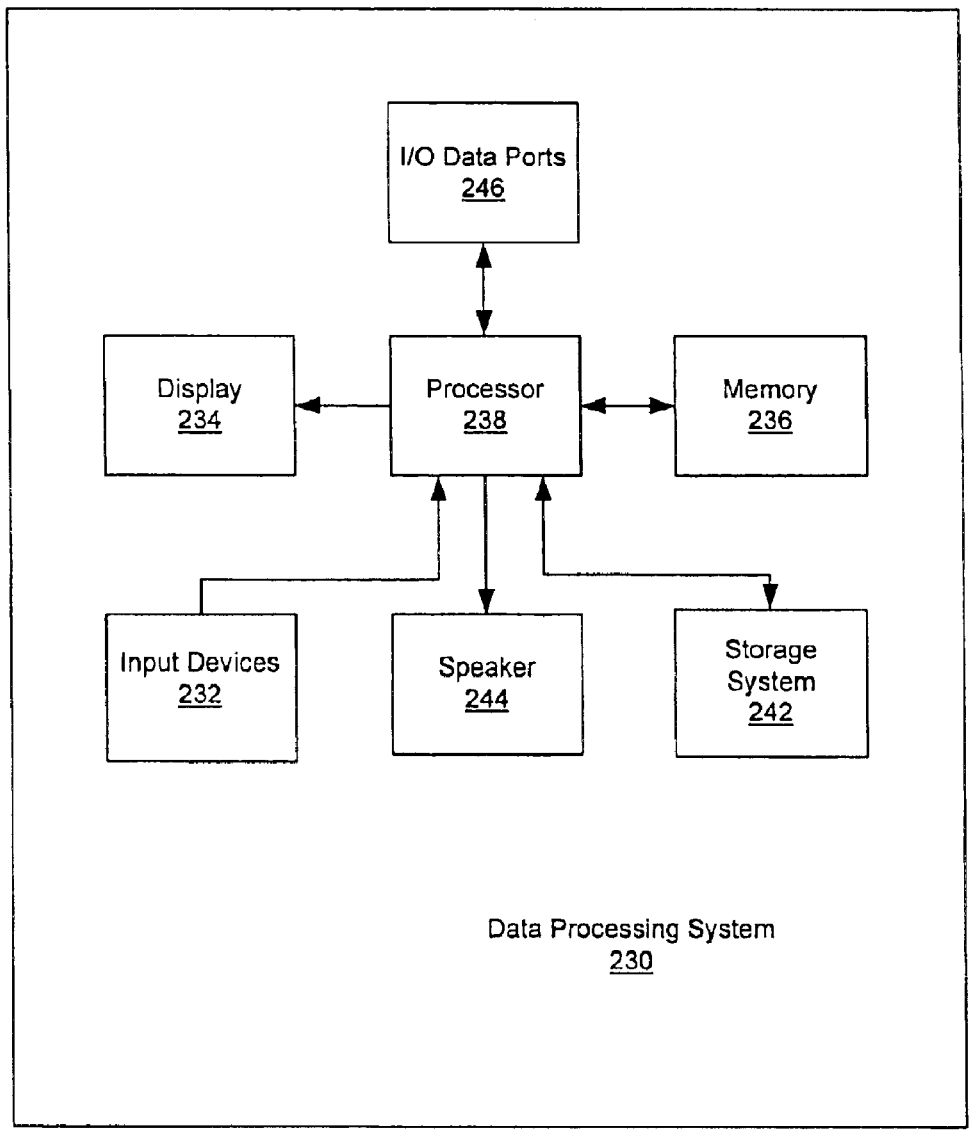
FIG. 1 is a block diagram of data processing systems according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or compiled Basic (CBASIC). Preferably, the computer program code which provides subroutines accessible to an existing application is written in the same language as the existing application, although, the program code may be written in any language compatible with the language of the existing application. It is also preferred that any classes written to invoke static Java methods be written in Java. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention may provide for extending existing applications with static Java methods. Such an extension may be accomplished by an existing application calling a subroutine or subroutines to build a message which is sent to a "catcher" class executing in a JVM which invokes a Java static method. Optionally, return parameters may be provided by the static Java method to the existing application by the catcher class receiving the parameters and generating a message (containing the parameters) which is sent to a subroutine invoked by the existing application. The subroutine receives the message and provides the return parameters to the existing application. In such a manner, an application which typically could not invoke a static Java method, for example, through the JNI, may invoke static Java methods. Thus, the functionality of static Java methods may be provided to an existing application.

Various embodiments of the present invention will now be described with reference to FIGS. 1 through 8.

Referring now to FIG. 1, an exemplary embodiment of a data processing system 230 in accordance with embodiments of the present invention typically includes input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). These components may be conventional components such as those used in many conventional computing devices which may be configured to operate as described herein.

Figure 2:
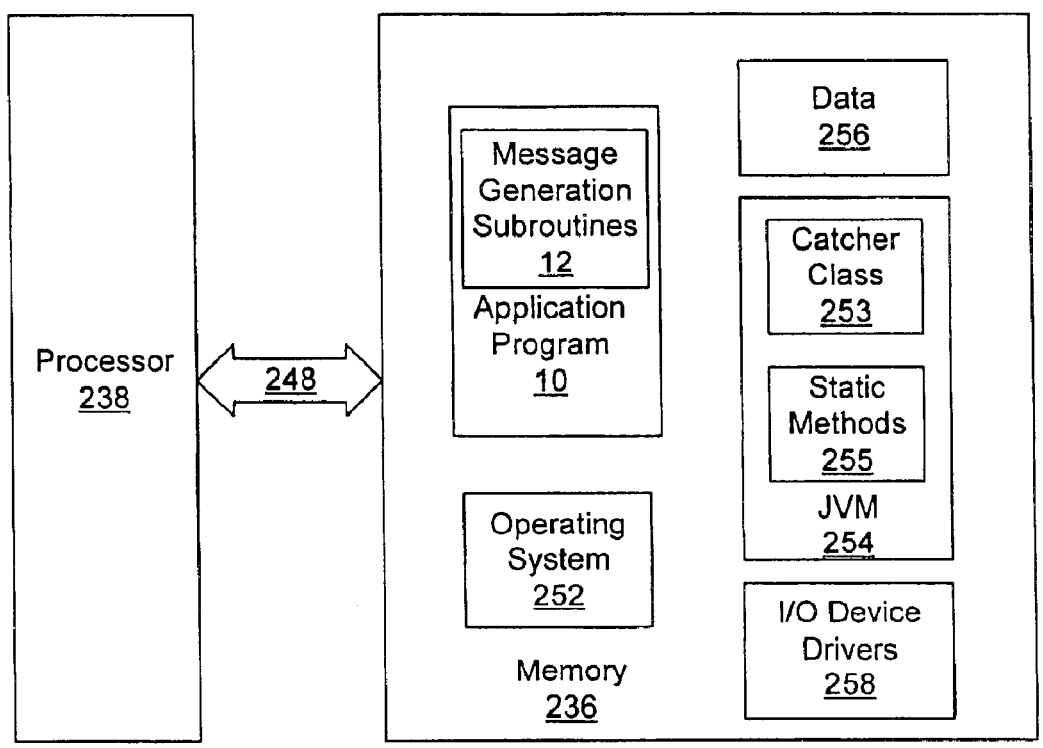
FIG. 2 is a more detailed block diagram of data processing systems according to embodiments of the present invention.

FIG. 2 is a block diagram of data processing systems that illustrates systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 2, the memory 236 may contain several categories of software and data used in the data processing system 230: the operating system 252; the application program 10; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or Windows/NT from Microsoft Corporation, Redmond, Wash., Unix, Linux or another proprietary or non-proprietary operating system.

The I/O device drivers 258 typically include software routines accessed through the operating system 252 by the application program 10 to communicate with devices such as the input devices 232, the display 234, the speaker 244, the storage system 242, the I/O data port(s) 246, and certain memory 236 components. The application program 10 is illustrative of the programs that implement the various features of the data processing system 230. Also illustrated in FIG. 2 is a Java Virtual Machine (JVM) 254. Finally, the data 256 represents the static and dynamic data used by the application program 10, operating system 252, I/O device drivers 258, and other software programs that may reside in the memory 236.

As is further seen in FIG. 2, the application program 10 preferably includes message generation subroutines 12. Furthermore, the JVM 254 also preferably includes static methods 255 and a catcher class 253. The message generation subroutines 12 preferably are called by the application program 10 to generate a message which is provided, possible through a device driver, to the catcher class 253 of the JVM 254. The message specifies one or more of the static methods 255 to invoke and may provide parameters utilized by the invoked static method or methods. The catcher class 253 receives the message and invokes the specified static methods 255 and provides any return parameters back to the message generation subroutines 12. In such a way, the static methods 255 may be utilized to extend the application program 10 without requiring that the application program 10 be written in a language which is compatible with Java.

While the present invention is illustrated, for example, with reference to message generation subroutines 12 of the application program 10 which carries out the operations for invoking the static methods 255, as will be appreciated by those of skill in the art, these functions may also be incorporated into other applications, the operating system 252 or the I/O device drivers 258. Thus, the present invention should not be construed as limited to the configuration of FIG. 2 but is intended to encompass any configuration capable of carrying out the operations described herein.

Figure 3:
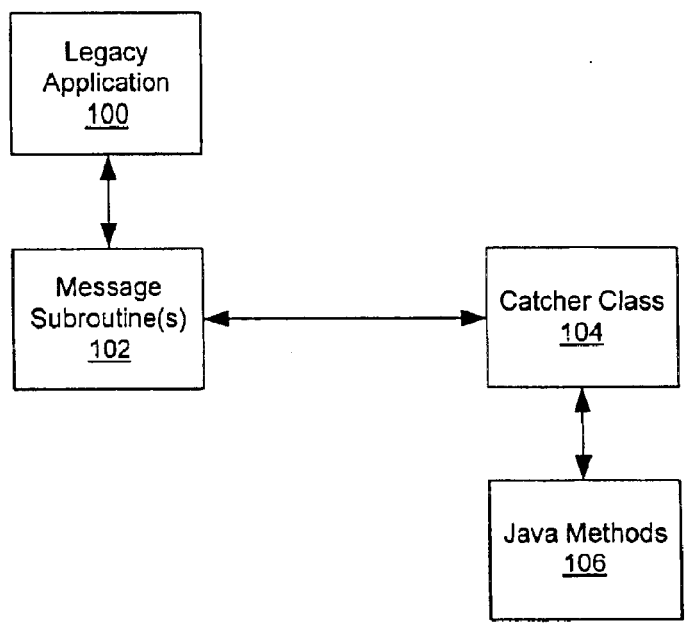
FIG. 3 is a block diagram illustrating embodiments of the present invention.
Figure 4:
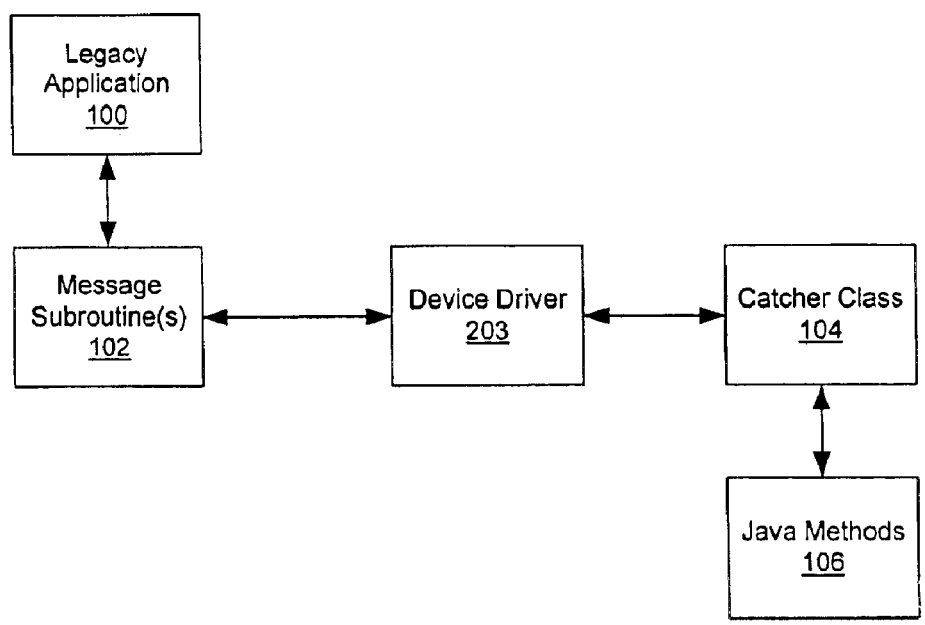
FIG. 4 is a block diagram illustrating further embodiments of the present invention.

FIGS. 3 and 4 are block diagrams illustrating embodiments of the present invention. As seen in FIG. 3, a legacy application 100 communicates through a message subroutine or subroutines 102. The message subroutine(s) 102 receive information from the legacy application 100 which enables the message subroutine(s) 102 to construct a message which identifies a Java static method to invoke and provides any pass parameters for the static method. The message subroutine(s) 102 are preferably directly callable by the legacy application 100. For example, many legacy applications 100 have user exit points provided in the code of the application. These user exits may be utilized to pass control to code provided by a user to extend the functionality of the legacy application 100. Such user provided code may, for example, be used to call the message subroutine(s) 102. Alternatively, the legacy application 100 itself could be modified to call the message subroutine(s) 102.

The message subroutine(s) 102 also communicate with a Java catcher class 104 which is instantiated in a JVM. The message subroutine(s) 102 communicate with the catcher class 104 by sending the message to the catcher class 104. In particular embodiments of the present invention, the message may be a byte array or a binary file. The message may be sent to the catcher class 104 via any mechanism available for sending data to the catcher class 104 of the JVM. For example, a network layer protocol may be utilized to communicate between the subroutines 102 and the catcher class 104 and a binary file transferred in such a manner.

One particular mechanism for transferring the message to the JVM is through a device driver 203 as illustrated in FIG. 4. Thus, for example, if the message subroutine(s) 102 is written in a language which may not directly provide information to the Java catcher class 104, the device driver 203 may be utilized to transfer the message, for example, as a byte array, to the catcher class 104 of the JVM. Techniques for utilizing a device driver to communicate between a legacy application and a JVM are described in commonly assigned U.S. pat. application Ser. No. 09/409,324, filed Sep. 30, 1999, entitled METHOD AND SYSTEM FOR EXTENDING THE FUNCTIONALITY OF COMPUTER PROGRAMS WITHOUT MODIFYING THE PROGRAM CODE, the disclosure of which is incorporated by reference herein as if set forth fully herein. However, the present invention should not be construed as limited to the use of a device driver to transfer the message from the message subroutine(s) 102 to the catcher class 104 but is intended to encompass any method of transferring data to the JVM.

Figure 5:
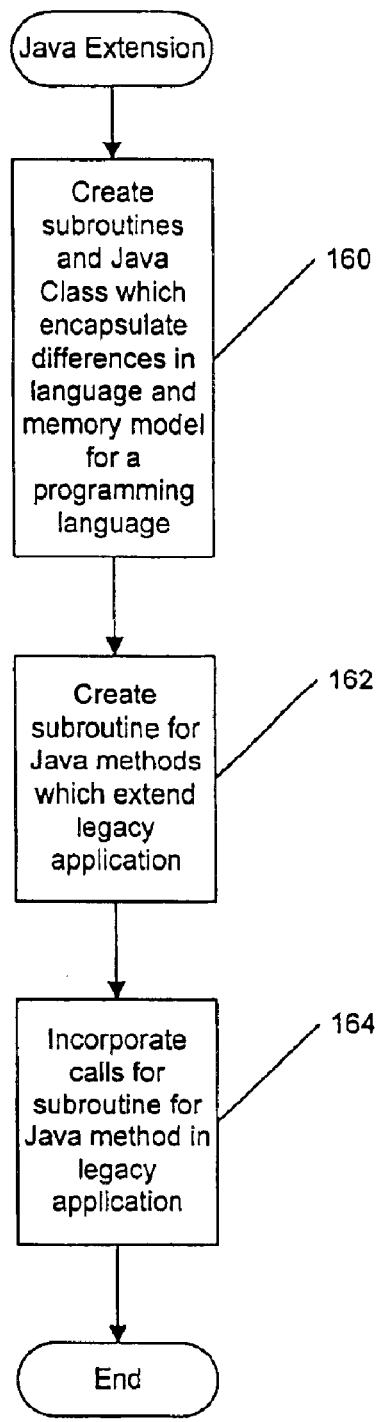
FIG. 5 is a flow chart illustrating operations according to embodiments of the present invention.

As is further illustrated in FIGS. 3 and 4, the catcher class communicates with the Java methods 106 and invokes the method(s) specified by the received message. The catcher class 104 may also receive results of the invocation of the Java method(s) 106 and format them as a message to be sent back to the message subroutine(s) 102. The message would then be passed back to the message subroutine(s) 102 utilizing any suitable communication mechanism, for example, through device driver 203, and the results formatted and provided by the message subroutine(s) 102 to the legacy application 100. FIGS. 5 through 8 illustrate operations of data processing systems for carrying out embodiments of the present invention. For example, the data processing systems illustrated in FIGS. 1 and 2 and systems illustrated by the block diagrams of FIGS. 3 and 4 may be utilized for carrying out operations according to embodiments of the present invention. As seen in FIG. 5, subroutines and a Java class are created which encapsulate the differences between the programming language and/or memory model of the legacy application and the Java programming language and memory model (block 160). A subroutine may also be created to invoke a Java method to extend an application by calling the subroutines which encapsulate the differences between the programming languages and/or memory models (block 162). Calls to the subroutines which invoke the Java methods may then be incorporated into a legacy application to extend the application with the Java methods (block 164). These subroutine calls may be incorporated into the legacy application directly by revising the code of the legacy application to incorporate the subroutine calls in each of the desired locations. However, in many circumstances the code of the legacy application may be inaccessible, accordingly, the subroutine calls may be incorporated into the code through user exits which have been built into the legacy application.

Through the encapsulation of the differences between the programming language and/or memory model by a subroutine(s) and a Java class, the present invention may provide for the extension of existing applications with Java methods. Furthermore, such extensions may be incorporated in varying degrees. For example, some Java methods may be used to augment existing functionality, however, other Java methods may be used to replace functionality in the existing application. The degree to which the Java methods replace functionality of existing applications may vary depending on the particular use of the present invention. However, as will be appreciated by those of skill in the art in light of the present disclosure, the present invention may provide a mechanism for incremental migration of legacy applications to Java embodiments. For example, increasing amounts of functionality of a legacy application could be replaced by Java methods and those methods tested without replacing the entire legacy application until the various methods which make up the new application had been tested. Thus, in addition to extending the capabilities of existing applications, the present invention may provide an efficient and reliable mechanism for the migration of legacy applications to Java.

Figure 6:
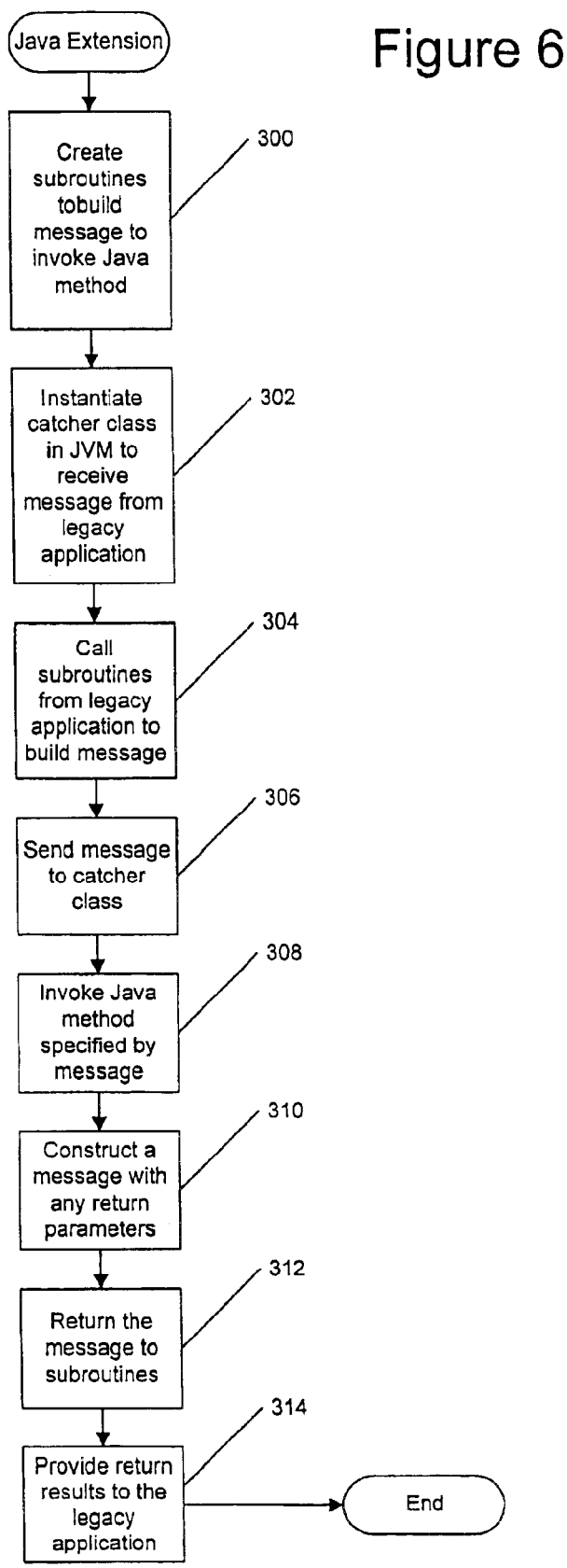
FIG. 6 is a flow chart illustrating operations according to embodiments of the present invention.

Particular embodiments of the present invention are further illustrated in FIG. 6. As seen in FIG. 6, subroutines are created to build and transfer messages to a Java class which interprets the messages to invoke a Java method (block 300). The subroutines may be written in any language compatible with the legacy application which is to be extended with the Java methods. The specific functions carried out by the subroutines may vary from language to language and vary based on the Java method which is to be invoked. For example, in an embodiment of the present invention where the legacy application is written in CBASIC, subroutines may construct a byte array or binary file which contains an identification of the Java class and method to be invoked, a return type and parameters for the method. In the exemplary embodiment, these parameters may be placed in a string variable.

In addition to creating the subroutines to build the message to invoke the Java method, a "catcher class" is also created and instantiated in the JVM (block 302). The catcher class receives the messages from the subroutines utilizing whatever communication mechanism is established and parses the messages to determine their contents. The catcher class also creates messages to return to the subroutines associated with the application.

As is further illustrated in FIG. 6, the created subroutines are called by the legacy application to build a message to invoke a Java method (block 304). The subroutines build the message, which may include an identification of the Java class and method, a return type for any return parameters and any parameters needed to invoke the method, and then send the message to the catcher class (block 306). As described above, the message may be sent to the catcher class utilizing any communication technique which allows the subroutines to send the message to the catcher class. Such techniques may, therefore, include providing the message as a byte array or binary file to a driver which then provides the byte array or binary file to the catcher class instantiated in the JVM.

The catcher class receives the message and interprets the message to invoke the Java method specified by the message (block 308). The catcher class may also construct a message which includes any return parameters from the Java method (block 310) and send this message to the subroutine which invoked the Java method (block 312). The subroutine may receive the message and format any return parameters to provide the results of the invocation of the Java method to the legacy application (block 314).

Figure 7:
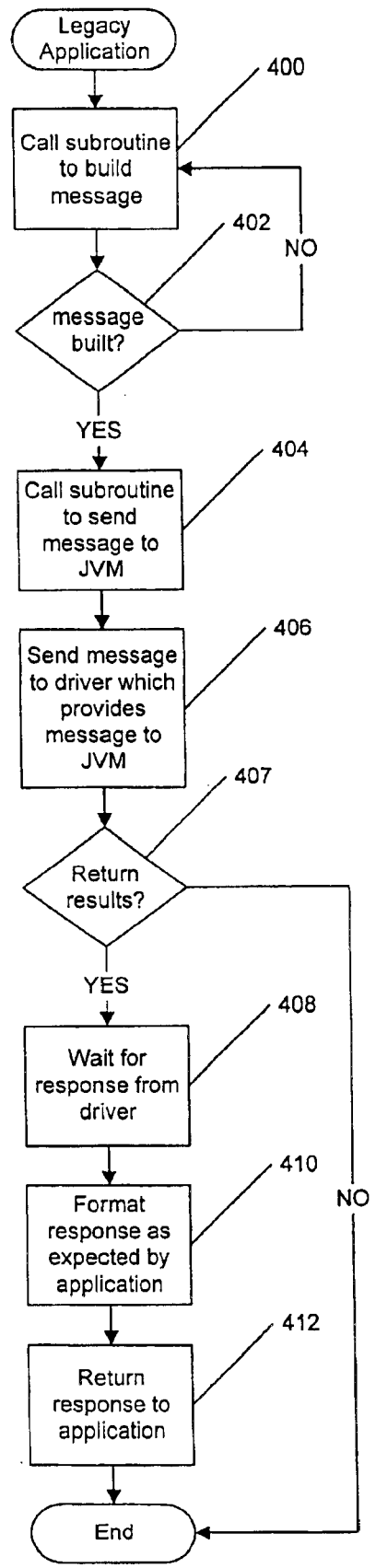
FIG. 7 is a flow chart illustrating operations performed by existing applications and/or subroutines accessed by the existing applications according to embodiments of the present invention.

FIG. 7 illustrates operations carried out in the application space of the legacy application (i.e. utilizing the memory model and compatible programming languages with the legacy application) for embodiments of the present invention. As seen in FIG. 7, the legacy application calls a subroutine to build a message which invokes a Java method (block 400). Additional subroutines may be called until the message to invoke the Java method is complete (block 402). When the message is complete a subroutine may be called to send the message to the JVM (block 404) and, as illustrated in FIG. 7, the message is provided to a driver which provides the message to the JVM (block 406). The subroutine determines if a response is expected in response to the Java method being invoked and, if not (block 407), the invocation of the Java method is complete. However, if a response is expected from the Java method (block 407), then the subroutine waits for a response message from the driver (block 408). Such a wait may be accomplished by periodically polling the driver to determine if a response is available and requesting if it is available. When the response is received from the driver, the subroutine parses the received message to extract the response and formats the response into a format expected by the legacy application (block 410). The response is then provided to the application (block 412).

Figure 8:
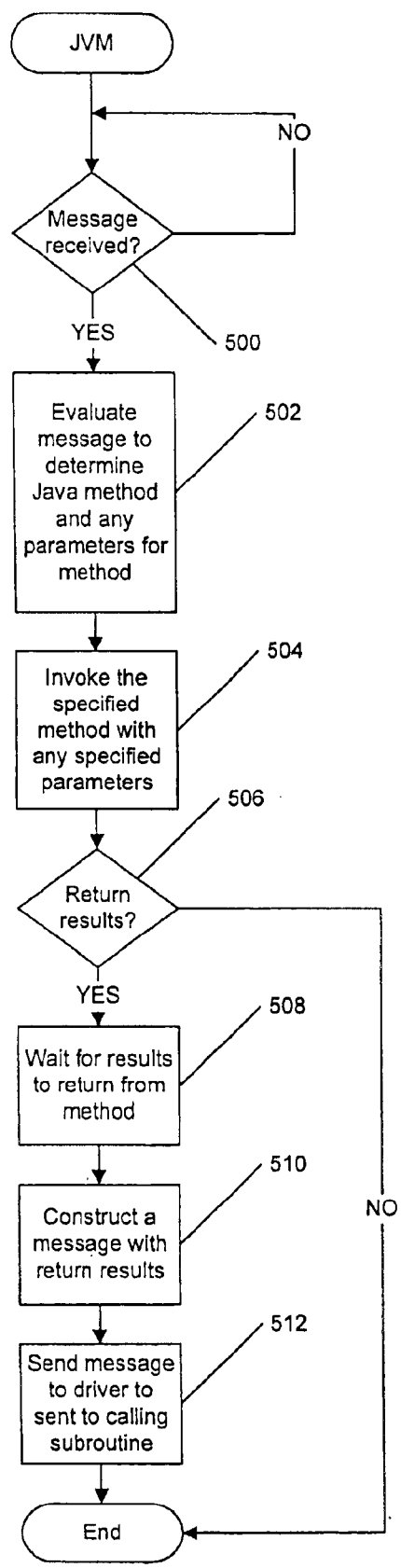
FIG. 8 is a flow chart illustrating operations carried out by a Java Virtual Machine (JVM) according to embodiments of the present invention.

FIG. 8 illustrates operations carried out in the application space of the JVM (i.e. utilizing the memory model and compatible programming languages with the JVM). As seen in FIG. 8, the catcher class in the JVM waits for a message from the driver (block 500). Such a wait may be accomplished, for example, by periodically requesting any queued messages from the driver. When a message is received, the catcher class evaluates the message to determine the Java class and method to invoke (block 502). The catcher class may also extract any parameters to be utilized by the Java method from the message (block 502). The specified Java method is then invoked with any specified parameters (block 504). The catcher class may also determine if any results are to be returned to the legacy application (block 506) and, if not, then the invocation of the Java method is complete.

If results are expected (block 506), then the catcher class waits for the results (block 508). When the results are received from the invoked Java method, the catcher class constructs a message containing the results (block 510). The message is then, for example, provided to the driver to be sent to the calling subroutine (block 512).

The flowcharts and block diagrams of FIGS. 1 through 8 illustrate the architecture, functionality, and operation of possible implementations providing for access of static Java methods by existing applications according to the present invention. In this regard, each block in the flow charts represents a module, segment, or portion of code, which comprises one or more executable instructions for implementing the specified logical function(s). It should also be noted that in, some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

Aspects of embodiments of the present invention may be illustrated by way of example. In an embodiment of the present invention incorporated into the 4690 Point Of Sale Operating System, Version 2, Release 2, available from International Business Machines Corporation, Armonk, N.Y., applications written in CBASIC may invoke static methods written in Java. A CBASIC STRING variable is utilized to supply the memory in which to construct a request to invoke a Java method. A subroutine is provided which may be called to specify the name of the class, the name of the method and the return type other subroutines are provided to add parameters to the request. A subroutine is also provided for each variable type that could be passed as a parameter as a result of BASIC being a strongly typed language. Once all the parameters are assembled, one of several provided "invoke method" subroutines may be called. An invoke method subroutine is provided for each possible return type because of the strong typing of BASIC.

An operating system device driver is provided to handle sending the buffer corresponding to the STRING variable from the BASIC application to a special Catcher Class in the JVM. The invoke method subroutine executes a special call to the driver which passes the buffer containing the constructed request. The driver enqueues the request and then waits until the Catcher Class in the JVM makes a call to the driver requesting work. The driver then passes the request to the Catcher Class for processing.

The Catcher Class parses the request and utilizes the CLASS object and INVOKE method on that object to invoke the specified method. When the method returns any return data, the data is formatted by the Catcher Class into a byte array and passed back to the driver. The driver uses this return data to complete the original SPECIAL request that came from the CBASIC subroutines.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of extending an application written in a first programming language with methods of Java classes, wherein the first programming language cannot directly access the Java classes, the method comprising the steps of:

providing at least one subroutine accessible by the application written in the first programming language that cannot directly access the Java classes and which is configured to communicate with a Java class;

providing at least one Java class which is configured to invoke a Java method and to communicate with the at least one subroutine; and utilizing the at least one subroutine and at least one Java class to invoke Java methods from the application written in the first programming language that cannot directly access the Java classes.

2. A method according to claim 1, wherein the step of utilizing the at least one subroutine and at least one Java class comprises the steps of:

calling the at least one subroutine accessible by the application so as to build a message having content which identifies a Java method to invoke;

sending the message to a Java Virtual Machine;

executing the Java class in the Java Virtual Machine (JVM) wherein the Java class receives the message and interprets the message so as to identify a Java method to invoke; and invoking the Java method identified in the message.

3. A method according to claim 2, wherein the step of calling the at least one subroutine accessible by the application so as to build a message having content which identifies a Java method to invoke further comprises the step of building a message having content which identifies a Java Class associated with the Java method to invoke, the Java method to invoke and pass parameters for the Java method to invoke.

4. A method according to claim 2, wherein the message comprises a byte array.

5. A method according to claim 2, wherein the step of sending the message to a Java Virtual Machine comprises the steps of:

sending the message to an operating system driver; and sending the message from the operating system driver to the Java class instantiated in the Java Virtual Machine.

6. A method according to claim 5, wherein the step of sending the message from the operating system driver to the Java class comprises the steps of:

queuing the message at the device driver;

receiving at the device driver a request for a message from the Java class; and providing the queued message to the Java class in response to the request from the Java class.

7. A method according to claim 2, wherein the step of calling at least one subroutine accessible by the application so as to build a message having content which identifies a Java method to invoke further comprises the step of building a message having content which identifies a Java class of the Java method to invoke, the Java method to invoke, pass parameters, and a type for at least one return parameter from the Java method, the method further comprising the steps of:

receiving at least one return parameter from the invoked Java method at the Java class which receives the message and interprets the message;

incorporating the at least one return parameter in a return message;

sending the return message from the Java class which receives the message to the at least one subroutine; and providing the return message to the application so as to provide the at least one return parameter to the application.

8. A method according to claim 7, wherein the return message comprises a byte array.

9. A method according to claim 7, wherein the step of sending the return message from the Java class to the at least one subroutine comprises the steps of:

sending the return message to an operating system driver; and sending the return message from the operating system driver to the at least one subroutine.

10. A method according to claim 1, wherein the step of providing at least one subroutine comprises the step of providing a plurality of subroutines; and wherein the step of utilizing the at least one subroutine comprises the step of utilizing the plurality of subroutines and the at least one Java class to invoke Java methods from the application.

11. A method according to claim 10, wherein the step of utilizing the plurality of subroutines and at least one Java class to invoke Java methods from the application comprises utilizing selected ones of the plurality of subroutines and the at least one Java class to invoke Java methods from the application.

12. A system for extending existing applications with Java methods, comprising:

an application utilizing a first memory model;

a Java Virtual Machine utilizing a second memory model, different from the first memory model;

a Java class configured to receive requests to invoke a static Java method, wherein the Java class utilizes the second memory model;

at least one subroutine callable by the application which is configured to send messages to the Java class to invoke the static Java method, wherein the application cannot directly access the Java class.

13. A system according to claim 12, further comprising an operating system driver configured to receive requests from the at least one subroutine and provide the received requests to the Java class.

14. A system according to claim 12, wherein the Java class is further configured to return results of the invocation of the Java method to the at least one subroutine and wherein the at least one subroutine is further configured to provide the returned results to the application.

15. A system according to claim 14, further comprising an operating system driver configured to receive requests from the at least one subroutine and provide the received requests to the Java class and to receive results for the Java class and provide the results to the at least one subroutine.

16. A system for extending an application written in a first programming language with methods of Java classes, wherein the first programming language cannot directly access the Java classes, comprising:

means for providing at least one subroutine accessible by the application written in the first programming language that cannot directly access the Java classes and which is configured to communicate with a Java class;

means for providing at least one Java class which is configured to invoke a Java method and to communicate with the at least one subroutine; and means for utilizing the at least one subroutine and at least one Java class to invoke Java methods from the application written in the first programming language that cannot directly access the Java classes.

17. A system according to claim 16, wherein the means for utilizing the at least one subroutine and at least one Java class, further comprise:

means for calling the at least one subroutine accessible by the application so as to build a message having content which identifies a Java method to invoke;

means for sending the message to a Java Virtual Machine;

means for executing the Java class in the Java Virtual Machine (JVM) wherein the Java class receives the message and interprets the message so as to identify a Java method to invoke; and means for invoking the Java method identified in the message.

18. A system according to claim 17, wherein the means for calling the at least one subroutine accessible by the application so as to build a message having content which identifies a Java method to invoke further comprises means for building a message having content which identifies a Java Class associated with the Java method to invoke, the Java method to invoke and pass parameters for the Java method to invoke.

19. A system according to claim 17, wherein the message comprises a byte array.

20. A system according to claim 17, wherein the means for sending the message to a Java Virtual Machine comprises:

means for sending the message to an operating system driver; and means for sending the message from the operating system driver to the Java class instantiated in the Java Virtual Machine.

21. A system according to claim 20, wherein the means for sending the message from the operating system driver to the Java class comprises:

means for queuing the message at the device driver;

means for receiving at the device driver a request for a message from the Java class; and means for providing the queued message to the Java class in response to the request from the Java class.

22. A system according to claim 17, wherein the means for calling at least one subroutine accessible by the application so as to build a message having content which identifies a Java method to invoke further comprises means for building a message having content which identifies a Java class of the Java method to invoke, the Java method to invoke, pass parameters, and a type for at least one return parameter from the Java method, the system further comprising:

means for receiving at least one return parameter from the invoked Java method at the Java class which receives the message and interprets the message;

means for incorporating the at least one return parameter in a return message;

means for sending the return message from the Java class which receives the message to the at least one subroutine; and means for providing the return message to the application so as to provide the at least one return parameter to the application.

23. A system according to claim 22, wherein the return message comprises a byte array.

24. A system according to claim 22, wherein the means for sending the return message from the Java class to the at least one subroutine comprises:

means for sending the return message to an operating system driver; and means for sending the return message from the operating system driver to the at least one subroutine.

25. A system according to claim 16, wherein the means for providing at least one subroutine comprises means for providing a plurality of subroutines; and wherein the means for utilizing the at least one subroutine comprises means for utilizing the plurality of subroutines and the at least one Java class to invoke Java methods from the application.

26. A system according to claim 25, wherein the means for utilizing the plurality of subroutines and at least one Java class to invoke Java methods from the application comprises means for utilizing selected ones of the plurality of subroutines and the at least one Java class to invoke Java methods from the application.

27. A computer program product for extending an application written in a first programming language with methods of Java classes, wherein the first programming language cannot directly access the Java classes, comprising:

a computer-readable storage medium having computer-readable program code embodied in said medium, said computer-readable program code comprising:

computer-readable program code which provides at least one subroutine accessible by the application written in the first programming language that cannot directly access the Java classes and which is configured to communicate with a Java class;

computer-readable program code which provides at least one Java class which is configured to invoke a Java method and to communicate with the at least one subroutine; and computer-readable program code which utilizes the at least one subroutine and at least one Java class to invoke Java methods from the application written in the first programming language that cannot directly access the Java classes.

28. A computer program product according to claim 27, wherein the computer-readable program code which utilizes the at least one subroutine and at least one Java class, further comprise:

computer-readable program code which calls the at least one subroutine accessible by the application so as to build a message having content which identifies a Java method to invoke;

computer-readable program code which sends the message to a Java Virtual Machine;

computer-readable program code which executes the Java class in the Java Virtual Machine (JVM) wherein the Java class receives the message and interprets the message so as to identify a Java method to invoke; and computer-readable program code which invokes the Java method identified in the message.

29. A computer program product according to claim 28, wherein the computer-readable program code which calls the at least one subroutine accessible by the application so as to build a message having content which identifies a Java method to invoke further comprises computer-readable program code which builds a message having content which identifies a Java Class associated with the Java method to invoke, the Java method to invoke and pass parameters for the Java method to invoke.

30. A computer program product according to claim 28, wherein the message comprises a byte array.

31. A computer program product according to claim 28, wherein the computer-readable program code which sends the message to a Java Virtual Machine comprises:

computer-readable program code which sends the message to an operating system driver; and computer-readable program code which sends the message from the operating system driver to the Java class instantiated in the Java Virtual Machine.

32. A computer program product according to claim 31, wherein the computer-readable program code which sends the message from the operating system driver to the Java class comprises:

computer-readable program code which queues the message at the device driver;

computer-readable program code which receives at the device driver a request for a message from the Java class; and computer-readable program code which provides the queued message to the Java class in response to the request from the Java class.

33. A computer program product according to claim 28, wherein the computer-readable program code which calls at least one subroutine accessible by the application so as to build a message having content which identifies a Java method to invoke further comprises computer-readable program code which builds a message having content which identifies a Java class of the Java method to invoke, the Java method to invoke, pass parameters, and a type for at least one return parameter from the Java method, the computer program product further comprising:

computer-readable program code which receives at least one return parameter from the invoked Java method at the Java class which receives the message and interprets the message;

computer-readable program code which incorporates the at least one return parameter in a return message;

computer-readable program code which sends the return message from the Java class which receives the message to the at least one subroutine; and computer-readable program code which provides the return message to the application so as to provide the at least one return parameter to the application.

34. A computer program product according to claim 33, wherein the return message comprises a byte array.

35. A computer program product according to claim 33, wherein the computer-readable program code which sends the return message from the Java class to the at least one subroutine comprises:

computer-readable program code which sends the return message to an operating system driver; and computer-readable program code which sends the return message from the operating system driver to the at least one subroutine.

36. A computer program product according to claim 27, wherein the computer-readable program code which provides at least one subroutine comprises computer-readable program code which provides a plurality of subroutines; and wherein the computer-readable program code which utilizes the at least one subroutine comprises computer readable program code which utilizes the plurality of subroutines and the at least one Java class to invoke Java methods from the application.

37. A computer program product according to claim 36, wherein the computer-readable program code which utilizes the plurality of subroutines and at least one Java class to invoke Java methods from the application comprises computer-readable program code which utilizes selected ones of the plurality of subroutines and the at least one Java class to invoke Java methods from the application.

* * * * *